(12) United States Patent
Bhattacharya et al.

(10) Patent No.: US 11,238,595 B2
(45) Date of Patent: Feb. 1, 2022

(54) SYSTEM TO PREPARE IMAGES FOR PRESENTATION

(71) Applicant: AMAZON TECHNOLOGIES, INC., Seattle, WA (US)

(72) Inventors: Dibyendu Bhattacharya, Bangalore (IN); Ravi Kumar, Begusarai (IN); Sayantan Marik, Howrah (IN); Manisha Mehrotra, Bangalore (IN); Mathieu Spegagne, Luxembourg (LU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/988,388

(22) Filed: Aug. 7, 2020

(65) Prior Publication Data
US 2021/0398288 A1 Dec. 23, 2021

(51) Int. Cl.
*G06T 7/12* (2017.01)
*G06T 7/62* (2017.01)
*G06T 11/40* (2006.01)
*G06T 11/60* (2006.01)
*G06T 11/00* (2006.01)

(52) U.S. Cl.
CPC ............... *G06T 7/12* (2017.01); *G06T 7/62* (2017.01); *G06T 11/001* (2013.01); *G06T 11/40* (2013.01); *G06T 11/60* (2013.01)

(58) Field of Classification Search
None
See application file for complete search history.

(56) References Cited

PUBLICATIONS

"Bilateral Filtering for Gray and Color Images", 5 pages. Retrieved from the Internet: http://homepages.inf.ed.ac.uk/rbf/CVonline/LOCAL_COPIES/MANDUCHI1/Bilateral_Filtering.html.
"Contour Features", OpenCV, 4 pages. Retrieved from the Internet: https://docs.opencv.org/3.4/dd/d49/tutorial_py_contour_features.html.
"Contours: Getting Started", OpenCV, 2 pages. Retrieved from the Internet: https://docs.opencv.org/3.4/d4/d73/tutorial_py_contours_begin.html.
"Image Filtering", OpenCV 2.4.13.7, 28 pages. Retrieved from the Internet https://docs.opencv.org/2.4/modules/imgproc/doc/filtering.html?highlight=bilateralfilter#bilateralfilter.
"Structural Analysis and Shape Descriptors", OpenCV 2.4.13.7 documentation. Retrieved from the Internet: https://docs.opencv.org/2.4/modules/imgproc/doc/structural_analysis_and_shape_descriptors.html?highlight. "drawContours" (pp. 5-6), "boundingRect" (pp. 8-9), and "contourArea" (p. 9).

*Primary Examiner* — Jason A Pringle-Parker
(74) *Attorney, Agent, or Firm* — Lindauer Law, PLLC

(57) ABSTRACT

An input image of an object is prepared for presentation by removing extraneous portions such as text, logos, advertising, watermarks, and so forth. The input image is processed to determined contours of features depicted in the input image. A bounding box corresponding to each contour may be determined. Based at least in part on the areas of these bounding boxes, an image mask is created. A candidate image is determined by applying the image mask to the input image to set pixels within portions of the input image to a predetermined value, such as white. Many candidate images may be generated using different parameters, such as different thresholds for relative sizes of the areas of the bounding boxes. These candidate images may be assessed, and a candidate image is selected for later use. Instead of manual editing of the input images, the candidate images are automatically generated.

16 Claims, 8 Drawing Sheets

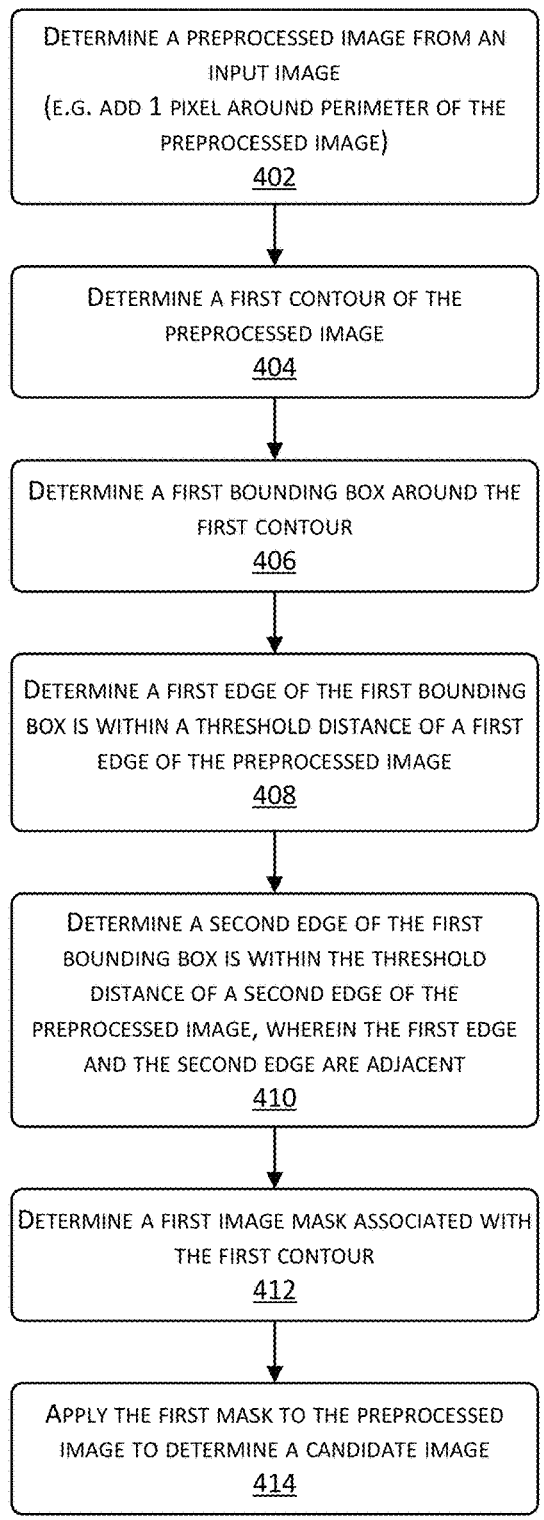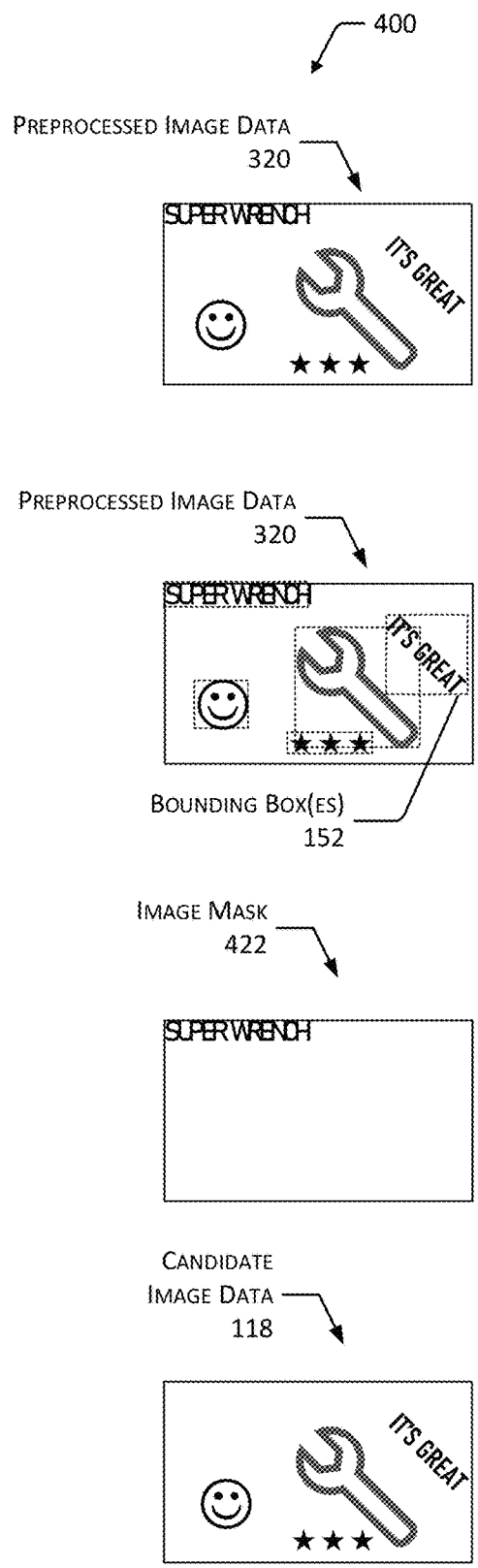
FIG. 4

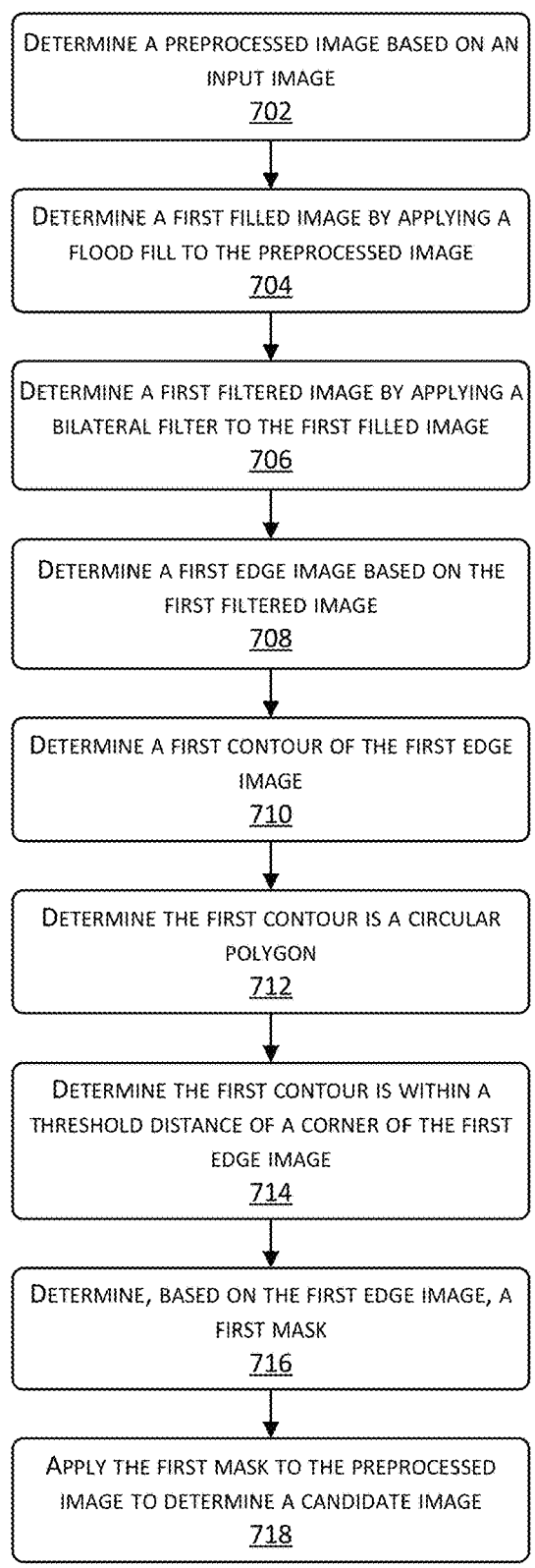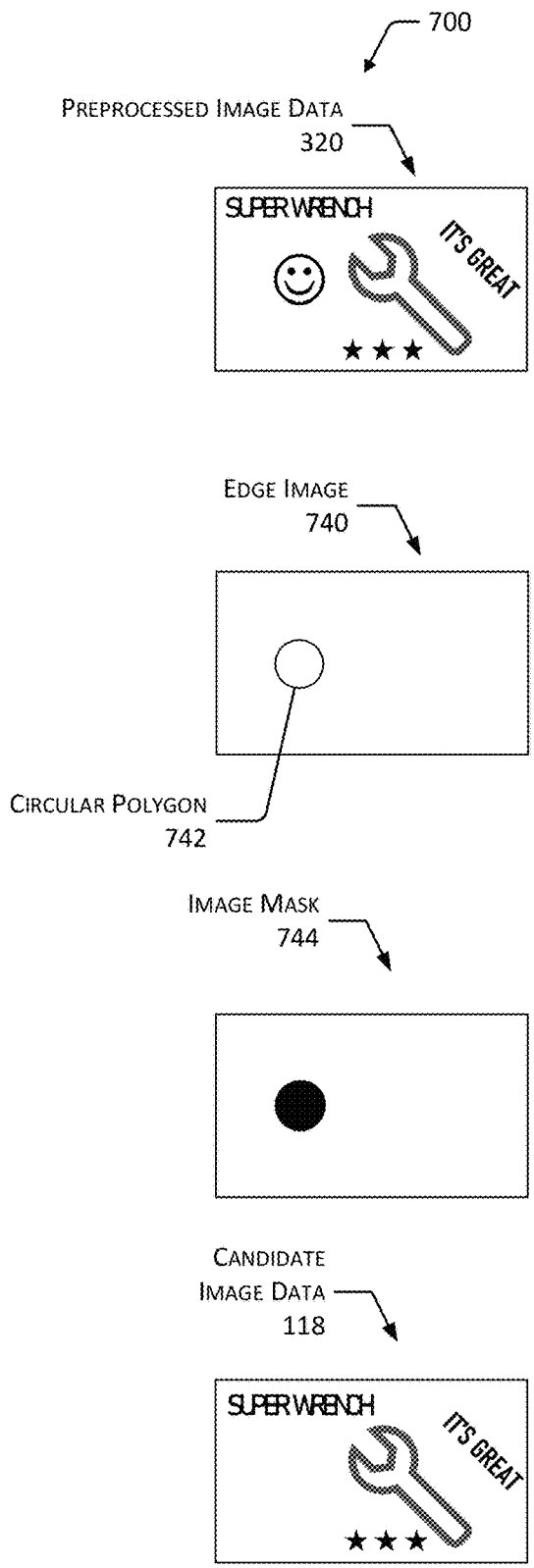
FIG. 7

SYSTEM TO PREPARE IMAGES FOR PRESENTATION

PRIORITY

This application claims priority to, and the benefit of, Indian Patent Application Serial No. 202011026599 filed on Jun. 23, 2020, titled "SYSTEM TO PREPARE IMAGES FOR PRESENTATION", the contents of which are hereby incorporated by reference into the present disclosure.

BACKGROUND

Digital imaging technologies have enabled users to capture, edit, and manipulate digital images of objects. These images of objects may include extraneous visible elements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a flow diagram of a process for determining a candidate image by removing an element that is in a corner of an input image, according to one implementation.

FIG. 7 is a flow diagram of a process for determining a candidate image by removing circular elements, according to one implementation.

Figure 1:
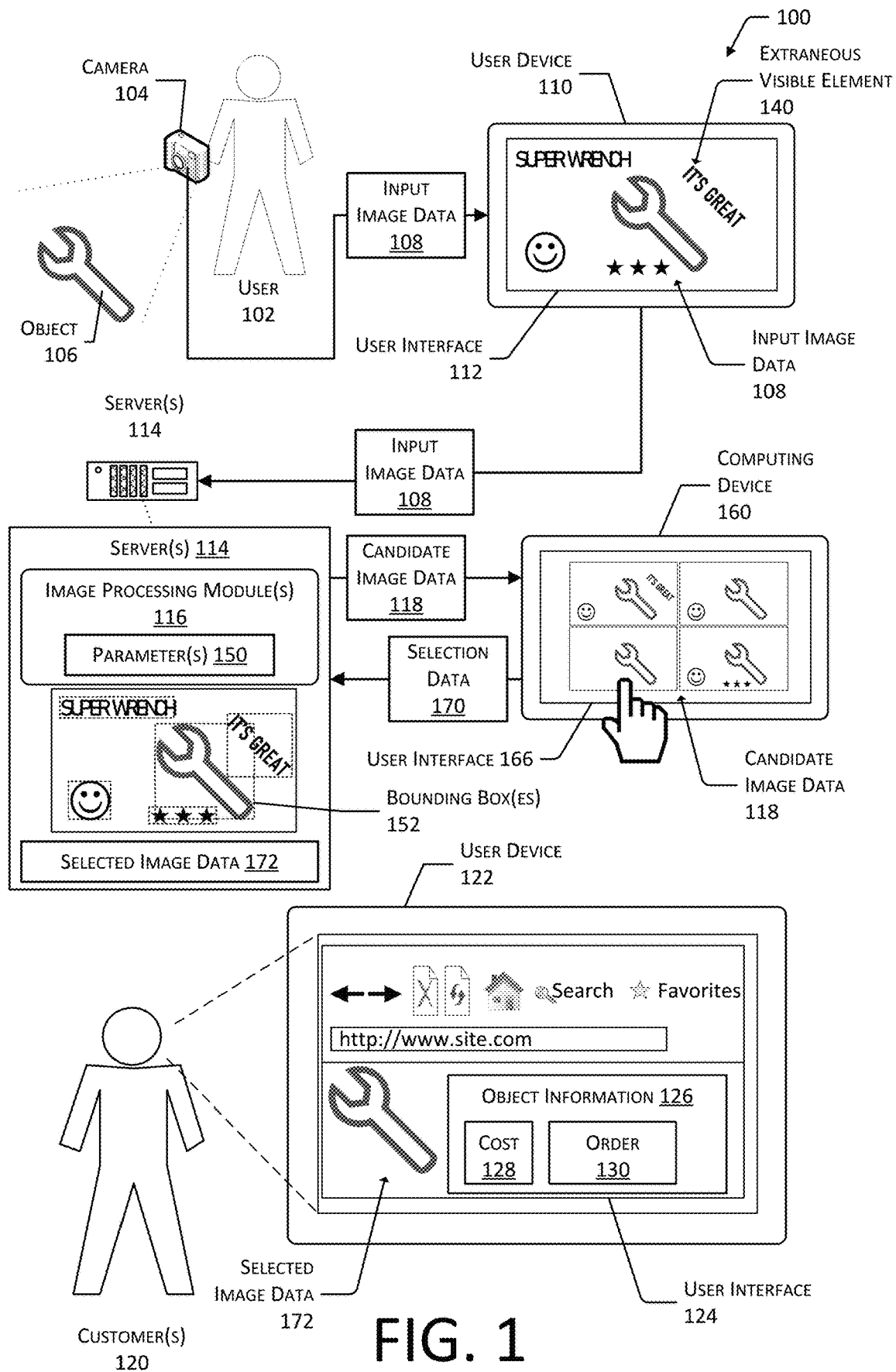
FIG. 1 depicts a schematic of a system for processing an input image depicting an object, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

More and more Internet users are realizing the ease and convenience of buying and selling online. The success of online shopping websites depends upon the ability to provide an enjoyable shopping experience and an easy-to-use user interface in which sellers are able to efficiently upload images to sell. Current online shopping websites have certain guidelines for submitting images to their online shopping websites. For example, the guidelines may include background color, number of items within an image, aesthetic requirements, technical requirements, standard naming conventions, and so forth. In another example, the guidelines may specify that the images of objects should be free from extraneous visible elements such as text, logos, graphics, watermarks, and so forth that are not actually part of an object depicted in the image.

Traditionally, these images would either be rejected or human operators would have to manually edit the images to remove the extraneous visible elements. An object with no approved image may be omitted from presentation on the website, negatively impacting sales. Until an image is available and conforms to the guidelines, the negative impact continues. Similarly, the delay associated with human operators editing an image is substantial, as is the cost of labor to make those edits. For example, a human operator making manual edits may complete the edits for only 15 images in a day.

This disclosure describes systems and apparatus for automated processing of images to clean input images by removing extraneous visible elements. The system may be an image processing pipeline that includes multiple modules that process an input image and provide a set of one or more candidate images. The set of candidate images may be assessed by a human operator or a machine learning system to select one or more candidate images that are deemed to be in compliance with the image submission guidelines or other criteria.

The selected one or more candidate images may then be used for presentation. For example, using the techniques described in this disclosure, a single human operator may be able to process 300 input images in one day by viewing the input image and a corresponding set of candidate images. One or more of the candidate images in the set of candidate images are selected and subsequently used for presentation. In the event no candidate image is deemed suitable, additional candidate images may be determined, manual editing may be undertaken, a message may be sent requesting a different input image for that object, and so forth.

The system provides an image processing service for users to submit images to be processed to place the images into compliance with image submission guidelines. In one implementation, a seller may provide an input image of an object to be uploaded to the online shopping website. The object may be goods, services, clothing, food, music, electronic books (e-books), audio books, other content, and so forth. In some implementations the object may be representative of a service, digital media, and so forth.

The images provided for processing are provided with the understanding that the provider has appropriate rights for use, including modification of images. Before processing as described below, the system may assess whether appropriate rights are available to use or modify the images. This may include processing by one or more of a digital rights management system, photo rights management system, image rights management system, and so forth. Information associated with the input images, such as metadata, visible watermark data, embedded watermark data, and so forth, may be compared to previously stored data. In the event that appropriate permissions are unknown or are not permitted, the system may cease further processing, flag for human intervention, contact a rights holder to obtain permission, and so forth.

The image processing service may perform one or more operations on an input image to determine the candidate images. For example, the image processing service may execute a module that determines a contour of elements in an input image, such as an image of a wrench within the input image. Bounding boxes are associated with each contour. Information about the bounding boxes may be used to determine portions of the image that are deemed likely to be of interest. In one implementation, an area or size of the bounding box may be used to determine extraneous visible elements. For example, the bounding box that is largest but does not span the entire image may be deemed to contain the object of interest. Smaller bounding boxes, such as associated with extraneous visible elements like text, logos, and so forth, may be removed. In some implementations an image mask may be determined. The image mask may specify portions of the input image that are to be removed or replaced in the candidate image with a predetermined value. For example, the resulting pixels in a candidate image that are associated with pixels in the image mask having a binary 1 may be set to a color value of "white" or "transparent". By providing this processing at intake of input image data, the overall efficiency of the system is substantially improved. Users are able to quickly correct any input images that are non-compliant with the guidelines, and more quickly make their goods or services available.

By using the techniques and systems described herein, the amount of time and labor to process an image is reduced and human interaction is minimized. The user interface that presents the candidate images and acquires selection data indicative of the selected candidate images is substantially faster and easier to use than existing interfaces that require the human to manually edit the image.

In implementations using a computing device to determine the selected candidate images, the overall processing requirements are substantially reduced. For example, the training of a neural network to select a candidate image may be substantially simpler and result in more accurate determinations than a system that attempts a semantic analysis of the input image.

Reducing the amount of time to process the input image also reduces the amount of time taken to prepare an object for sale. The techniques described herein are computationally efficient and can be performed with low latency. Additional benefits of reducing the processing time includes conservation of memory allocation, processor requirements, network bandwidth, and so forth. For example, by removing the extraneous visible elements, the file size of the resulting image is reduced compared to the input image. In addition, the reduction of processing time enables the systems to process more input images during a given time period. Furthermore, user experience is improved for both the seller, human operators tasked with providing images suitable for presentation, and customers as the user interface depicting the objects is more consistent and is free from extraneous visible elements.

Illustrative System

FIG. 1 depicts a schematic of a system 100 for processing an input image depicting an object. The system 100 may include a user 102. The user 102 may be a seller, vendor, merchant, company, individual, retailer, wholesaler, and so forth. The user 102 may use a camera 104 to capture an image of an object 106. The object 106 may be goods, an image depicting services, clothing, food, music, e-books, audio books, other content, and so forth. The user 102 may upload the image as input image data 108 to a user device 110. The user device 110 may include a desktop computer, a tablet computer, a wearable computer, an e-book reader, a media device, a cellular phone, a smartphone, a laptop computer, or another suitable apparatus. In other implementations, the user 102 may upload a digital representation of the object 106. For example, the digital representation may be a computer-generated rendering, an image copied from a website, a hand drawn image which is scanned and uploaded to the user device 110, and so forth. Continuing the example, the input image data 108 may comprise a photorealistic rendering generated by a computer-aided design (CAD) application. The input image data 108 may comprise one or more extraneous visible elements 140, such as text, logos, graphics, watermarks, and so forth. These extraneous visible elements 140 are separate from the object 106 represented in the input image data 108.

The user device 110 may provide a user interface 112. The user interface 112 may depict the input image data 108. For example, the input image data 108 may depict a wrench as acquired by the user 102 using the camera 104. In this example, the user interface 112 may depict the input image data 108 after the user 102 or some other party has added extraneous visible elements, such as text, graphics, and so forth.

The user 102 may upload the input image data 108 to an online shopping website. The online shopping website may be associated with one or more server(s) 114. In other implementations, the user 102 may access previously stored data depicting the object 106 and upload the previously stored data to the online shopping website. The previously stored data may be stored in a memory of the user device 110, stored on an external memory device, network accessible storage, or other device which the user device 110 may access, a data storage which may span across multiple servers that the user device 110 may access, and so forth. The server 114 may acquire the input image data 108 and upload or otherwise transfer the input image data 108 to an image processing module(s) 116, which may reside on the server 114 or another device.

The image processing module(s) 116 may determine whether appropriate rights are available to use or modify the images. In one implementation, information associated with the input images, such as metadata, visible watermark data, embedded watermark data, steganographic data, a hash of the entire image, and so forth, may be compared to previously stored data. For example, a digital rights management system may process the input image data 108 to confirm that appropriate rights are available for subsequent processing. The previously stored data may indicate information such as image rights-holders who have provided consent for use of the image, modification of the image, and so forth. In the event that appropriate permissions are unknown or are not permitted, the system may cease further processing, flag for human intervention, contact a rights holder to obtain permission, and so forth. In some implementations the data may indicate that rights permit the use of the input image data 108 without modification. For example, a file header may indicate that the input image data 108 has a "do not modify" flag set to inhibit cleaning or other processing.

The image processing modules 116 may determine contours of elements depicted in the input image data 108. A bounding box 152 may be associated with a contour. In other implementations, the image processing module(s) 116 may be downloaded or included on the user device 110 or a portion of the image processing module(s) 116 may be downloaded or included on the user device 110, while the remaining image processing module(s) 116 reside on the server 114 or other services.

The image processing module(s) 116 may provide an image processing pipeline that includes multiple modules that transform the input image data 108 into a set of candidate images as indicated by the candidate image data 118. In one implementation, these modules may implement one or more of the functions provided as libraries by OpenCV as described herein. The libraries may be found at github.com/opencv/opencv.

In one implementation, the candidate image data 118 is provided to a computing device 160 to determine selection data 170. The computing device 160 may comprise a device such as a personal computer, tablet, smartphone, and so forth that presents a user interface 166. The user interface 166 may be used by a human operator to view at least a portion of the candidate images and generate the selection data 170. In one implementation the determination of selection data 170 may be performed using mturk.com or other systems.

The image processing module(s) 116 may include or utilize one or more machine learning systems. The machine learning systems may be configured to learn without explicit programming. In one implementation the computing device 160 may implement a machine learning system. The machine learning system may comprise a neural network that has been trained to determine which of the candidate image data 118 comports with the guidelines for selection. For example, the input provided by the human operators to generate selection data 170 and the associated candidate image data 118 may be used as training data to train the machine learning system using supervised learning techniques.

The one or more candidate images, as indicated by the selection data 170 may then be used for subsequent presentation to a customer 120 or for other purposes. The customer 120 may access, via a user device 122, a user interface 124 to view an image of the selected image data 172. The user interfaces described herein may comprise a website user interface, a mobile application user interface, and so forth.

The user interface 124 may also enable the customer 120 to view object information 126 associated with the selected image data 172. For example, the object information 126 associated with the wrench may include wrench type, brand, wrench length, minimum opening, maximum opening, hand tool type, individual wrench or a set of wrenches, material, and so forth. The object information 126 may also include cost 128, which may be indicative of the cost of the object 106 and an order button 130. The order button 130 may enable the customer 120 to order the object 106 associated with the selected image data 172.

The user device 122 may be a desktop computer, a tablet computer, a wearable computer, an e-book reader, a media device, a cellular phone, a laptop computer, or another suitable apparatus.

The candidate image data 118 determined by the image processing module 116 may comprise a set of candidate images. In some implementations, each candidate image of the set of candidate images is determined using one or more of different modules, different combinations of modules, different parameters 150 for those modules, and so forth. Parameters 150 associated with the modules may define a keep percentage factor of image elements to be retained. For example, the process may be performed with a keep percentage factor of 0.6, indicating that any elements having an area (or elements) greater than or equal to 60% of a threshold percentage of an area of a largest element will be retained and the remaining will be masked. For some images, a value that produces a usable result may be 40%, while for other images the value may be 80%. During operation, the image processing modules 116 determine candidate images using 0.4, 0.6, and 0.8 as parameters 150. By using different parameters 150 and the different techniques described in this disclosure, a set of candidate images is determined that is likely to include a candidate image that is suitable for use in presentation.

In the event a suitable image is not deemed to be available, additional actions may be taken. For example, the image processing module 116 may generate additional candidate image data 118 using different parameters 150. In another example, the user interface 166 may include, or provide access to, an editing interface to allow manual editing. In yet another example, a message indicating rejection of the input image data 108 may be provided to the user 102.

As one skilled in the art will appreciate in light of this disclosure, certain embodiments may be capable of achieving certain advantages. For example, images that may contain extraneous visible elements 140 may be quickly processed into selected images suitable for presentation. In another example, the removal of extraneous visible elements 140 reduces the amount of data within the selected image data 172, resulting in a reduced file size, reducing the amount of data transferred on a network, reducing the amount of data processed for rendering on a device, and so forth. The reduction in file size and reduction in amount of data transfer is substantial. For example, if the set of input image data 108 comprises billions of images, the overall reduction in total data size that is realized by removing extraneous visible elements 140 is substantial.

The system 100 may also be used in a variety of different ways. Input image data 108 may be processed to determine selected image data 172 to build a set of training data for subsequent use in training a machine learning system that omits extraneous visible elements 140. The use of selected image data 172 provides substantial benefits to accurately training a neural network by reducing noise in the training data that the extraneous visible elements 140 would otherwise introduce.

Input image data 108 may comprise video data that is processed to remove extraneous visible elements 140. This may be done to protect privacy, reduce bandwidth for sending video data, declutter video data to reduce distractions to a viewer, and so forth. The processing of input image data 108 comprising video may be performed as part of a discrete operation, batch process, or in "real-time". For example, the system 100 may be implemented for use with a videoconferencing application. Video captured by a camera may be processed to remove extraneous visible elements 140. In some implementations the user 102 may be able to select candidate filter options to selectively remove one or more of the extraneous visible elements 140. For example, the user 102 may select a candidate image in which an image of a plant in the background has been removed. Based on this selection, the video output from the camera 104 may be processed to remove the plant in real time.

The system 100 may be used to improve the performance of image indexing systems. For example, the selected image data 172 may be used to generate image indexing, as input to an object recognition system, and so forth. By removing extraneous visible elements 140 the results from a search of selected image data 172 may be substantially more relevant than the use of input image data 108.

Described in the following portion of this disclosure are code illustrations that are provided by way of illustration and not as a limitation. In other implementations other functions, libraries, and so forth may be used. In some implementations, one or more modules or portions of the code illustrations may be omitted or otherwise modified. In some implementations the order of operation of modules may be implemented in an order different from that shown or described. The following code illustrations are expressed in Python and refer to functions in the OpenCV library available at github.com/opencv/opencv.

Figure 2:
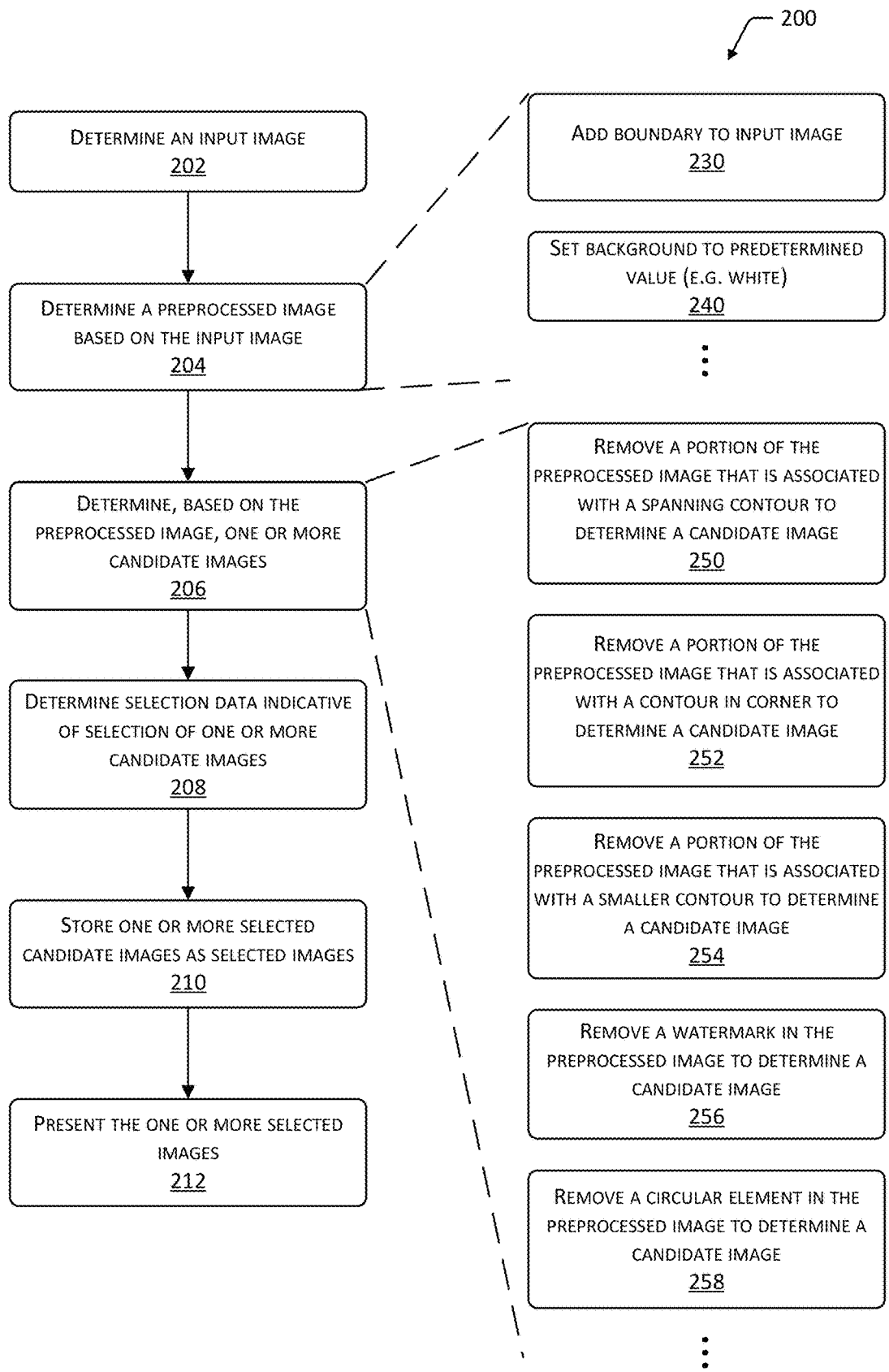
FIG. 2 is a flow diagram of a process for determining candidate images from input images, according to one implementation.

FIG. 2 is a flow diagram 200 of a process for determining candidate images from input images, according to one implementation. In some implementations the process may be implemented at least in part by one or more image processing modules 116.

At 202 an input image is determined. For example, the user 102 may use their user device 110 to upload input image data 108 to the image processing module 116.

At 204 a preprocessed image is determined based on the input image. For example, the image processing module 116 may accept as input the input image data 108 and perform one or more preprocessing operations to determine preprocessed image data. In some implementations, the preprocessing may be omitted and the input image data 108 may be used by the image processing module 116.

At 230 an additional boundary, such as an additional pixel, may be added to a perimeter of the input image to generate the preprocessed image data. Some functions described herein, such as contour determination, if not suitably modified, may operate incorrectly if a contour is in contact with an edge of the image. By adding the boundary, these functions may be used without modification. The following code illustration may be used to implement this, in some implementations.

```
def addBoundary(target):
    outputImage=cv2.copyMakeBorder(
        target,
        1,
        1,
        1,
        1,
        cv2.BORDER_CONSTANT,
        value=(255, 255, 255)
    )
    return outputImage
```
Code Illustration 1

At 240 a background of the input image may be set to a predetermined value, such as "white" or "transparent". For example, a thresholding function may be used to assess pixel values in the input image data 108. If a color value associated with a pixel is within a specified range, the color value for that pixel may be set to the predetermined value.

At 206, one or more candidate images are determined based on the input image. For example, the input image data 108 may be processed to determine the preprocessed image. The preprocessed image may in turn be processed using one or more techniques to determine candidate image data 118 representative of a one or more candidate images.

As described above, in some implementations the determination of the candidate image data 118 may utilize a process to determine contours present in an input image. These contours may be extracted and a list generated that includes those contours to be included in further processing. This determination as to which contours to retain may be based on the keep percentage factor. The following code illustration may be used in some implementations to implement the process of selecting contours.

```
# contours: contours to be processed
# keepPercentage: any contour larger than keepPercentage will be retained
def preProcess(contours, keepPercentage):
    _, boxArea, contourArea=getLargestArea(contours)
    # Hold all Contours having area larger than keepPercentage factor
    # These are the Contours will not be masked
    contourList=[ ]
    for contour in contours:
        area=getArea(contour)
        areaPercent=area/boxArea
        if (areaPercent>keepPercentage):
            contourList.append(contour)
        else:
            break
    return boxArea, contourArea, contours, contourList
```
Code Illustration 2

In some implementations, the determination of the candidate images may utilize a process to determine an image mask. In some implementations, the determination of the image mask may be based on the keep percentage factor. Other factors that may be considered during image mask generation are whether bounding boxes or contours overlap, and if so, the extent of that overlap.

```
# mask: Mask to be populated
# largestArea: area of largest contour
# contours: All contours of the image
# contourList: non-masked contours of the image
# keepPercentage: any contour larger than keepPercentage will be retained
# overlapPercentage: any contour area larger than overlapPercentage will be masked
def generateMask(mask, largestArea, contours, contourList, keepPercentage, overlapPercentage):
    for contour in contours:
        area=getArea(contour)
        areaPercent=area/largestArea
        # Check if area of this contour is smaller than largest contour by keepPercentage factor
        if (areaPercent<keepPercentage):
            # Found smaller candidate contour. Check if this contour can be masked
            if (canMask(contour, area, contourList, overlapPercentage)):
                cv2.drawContours(mask, [contour], -1, 0, -1)
    return mask
```
Code Illustration 3

In some implementations, a contour may be assessed to determine if including it in the image mask is appropriate. This assessment may include consideration of the following: A contour which will be masked is permitted to overlap another contour. A contour can either completely overlap, partially overlap, or have no overlap. A contour can overlap with any other contour that belongs to contourList. For example, contours C1, C2, C3 are the three largest contours and C4, C5, C6 are contours that need to be masked. For a given contour, a nearest largest neighboring contour(s) may be determined. For example, C4 may be near to C3, C5 is near to C1, and so forth. A candidate for a contour to be included in the image mask may partially, completely, or not overlap at all with a nearby largest contour.

contour: incoming contour to be masked
area: area of incoming contour
overlapPercentage: any contour area larger than overlapPercentage will be masked

```
# checkOverlap: If need to mask any Overlapped (partial
    or full) contours. Default True
def canMask(contour, area, contourList, overlapPercent-
    age, checkOverlap=True):
    x1, y1, w1, h1=cv2.boundingRect(contour)
    nearestCnt, dist=getNearestContour(contour, con-
        tourList)
    if (nearestCnt.all( )==0):
        return False
    # Bounding Box for nearest Contour
    x, y, w, h=cv2.boundingRect(nearestCnt)
    # Area of nearest Contour
    nearestCntArea=getArea(nearestCnt)
    # Calculate overlap percentage of Area
    percentage=area/nearestCntArea
    # If Contour doesn't overlap, mask it
    if noOverlap(x1, y1, w1, h1, x, y, w, h):
        return True
    # if contour is partially overlapping, mask it
    elif (partialOverlap(x1, y1, w1, h1, x, y, w, h) and
        checkOverlap):
        return True
    # if contour is fully overlapped by another contour,
        check overlapPercentage
    elif (percentage>overlapPercentage and checkOver-
        lap):
        return True
    else:
        return False
Code Illustration 4
```

The process of applying a mask image to another image is described in this disclosure. In one implementation, the application of the mask image may be used to remove some contours or other elements in an input image leaving the remainder of the input image intact.

```
    def applyMask(image, mask):
        image_inv=cv2.bitwise_not(image)
        target=cv2.bitwise_and(image_inv,     image_inv,
            mask=mask)
        target_inv=cv2.bitwise_not(target)
        return target_inv
Code Illustration 5
```

One or more techniques may be used either alone or in combination with other techniques, to determine the candidate image data 118. At 250 a portion of the input image data 108, or the preprocessed image, that is associated with a spanning contour may be removed to determine candidate image data 118. This process is discussed in more detail with regard to FIG. 3. At 252 a portion of the input image data 108, or the preprocessed image, is removed that is associated with a contour in a corner of the input image to determine candidate image data 118. This process is discussed in more detail with regard to FIG. 4. At 254 a portion of the input image data 108, or the preprocessed image, is removed that is associated with a smaller contour to determine candidate image data 118. This process is discussed in more detail with regard to FIG. 5. At 256 a portion of the input image data 108, or the preprocessed image, is removed that may be associated with a watermark contour to determine candidate image data 118. This process is discussed in more detail with regard to FIG. 6. At 258 a portion of the input image data 108, or the preprocessed image, is removed that is associated with a circular element to determine candidate image data 118. This process is discussed in more detail with regard to FIG. 7. In other implementations, other functions may be used as well.

At 208 selection data 170 indicative of selection of one or more of the one or more candidate images is determined. For example, at least a portion of the candidate image data 118 may be presented in a user interface 166. An operator, such as the user 102, reviewer, and so forth may review the presented images and provide input data that selects one or more of the candidate images. The selection data 170 may then be returned to the image processing module 116.

In one implementation, the selection data 170 may be determined using a machine learning system. For example, a trained neural network may be used to determine the selection data 170. In another implementation, the machine learning system may determine the selection data 170 automatically, unless a confidence value in the selection is less than a threshold value. For example, if the machine learning system is able to determine the selection data 170 for a set of candidate image data 118 with a confidence value of at least 0.95, the selection data 170 may be determined automatically. However, if the machine learning system is only able to determine selection data 170 for a particular set of candidate image data 118 with a confidence value of 0.70, the set of candidate image data 118 may be presented to an operator in the user interface 166 for manual selection.

In another implementation, the trained neural network may be used to pre-select candidate images for presentation in the user interface 166. For example, the trained neural network may be used to select a top four candidate images from the candidate image data 118 for presentation in the user interface 166. The user 102 or other operator may then generate the selection data 170 from the set of pre-selected candidate images.

At 210 the one or more selected candidate images, as indicated by the selection data 170 may be stored as selected images. For example, the selected candidate image(s) data 118 indicated by the selection data 170 may be stored as selected image data 172. The selected image data 172 may be associated with a particular object 106, record identifier, and so forth, for later use and retrieval. The unselected candidate image data 118 may be discarded. For example, the unselected candidate image data 118 may be erased from memory, memory pointers may be removed, and so forth.

At 212 one or more of the selected images are presented. In one implementation, a request for information about the object 106 may be received. Responsive to the request, the selected image data 172 comprising the selected candidate image(s) may be retrieved. Output data may be determined that comprises instructions to present the selected image data 172. For example, the customer 120 may request information about the wrench. Responsive to this, the servers 114 may present the user interface 124 with the selected image data 172 showing the selected image data 172 the depicts the wrench without the extraneous visible elements 140.

Figure 3:
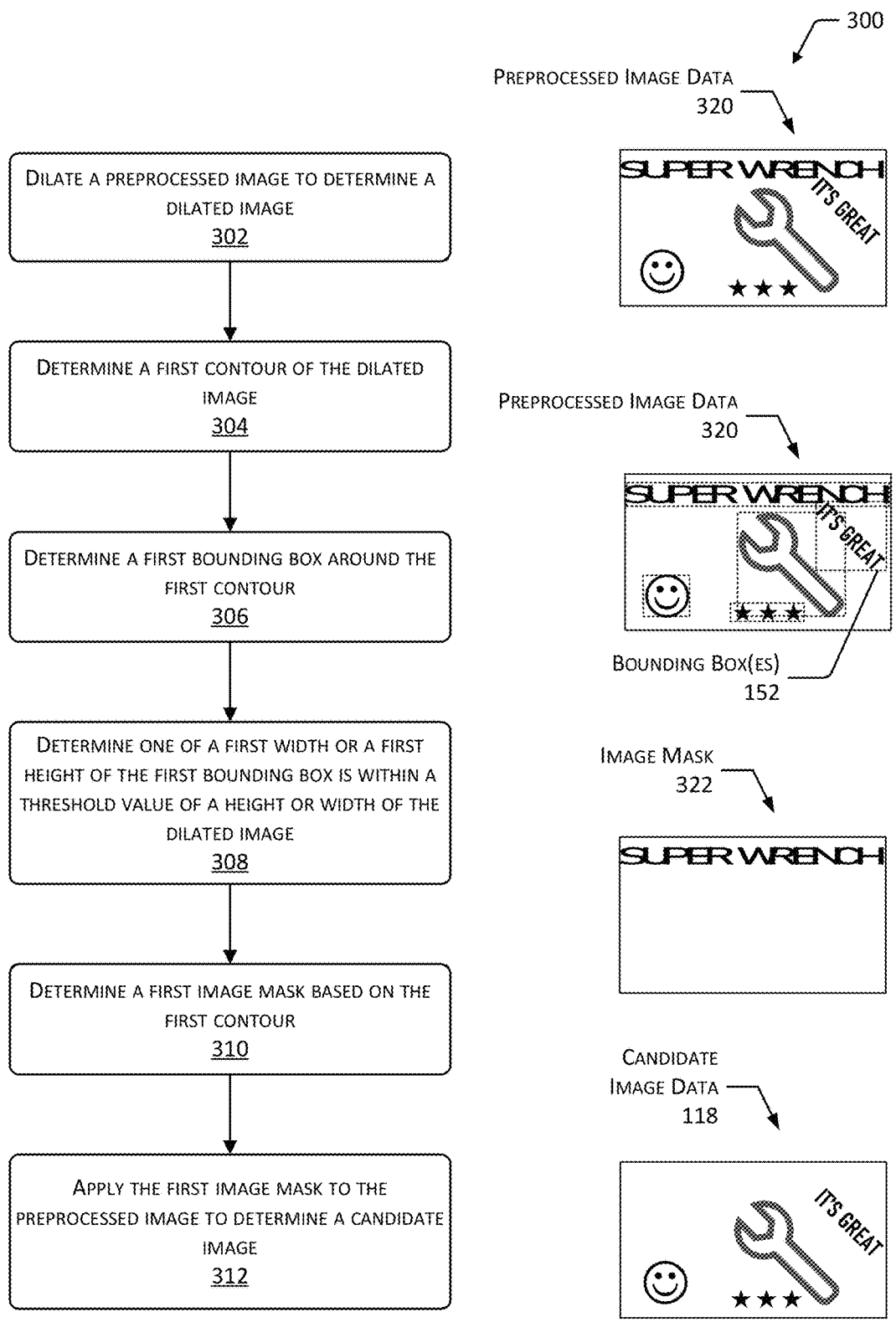
FIG. 3 is a flow diagram of a process for determining a candidate image by removing an element that spans an input image, according to one implementation.

FIG. 3 is a flow diagram 300 of a process for determining a candidate image by removing an element that spans an input image, according to one implementation. For example, an extraneous visible element 140 may span, or extend, from one edge of the input image to another. In some implementations the process may be implemented at least in part by one or more image processing modules 116.

At 302 a dilated image is determined by applying a dilation function to the preprocessed image. For example, a morphological operator may be used to perform a dilation operation on preprocessed image data 320. Dilation involves a convolution of the preprocessed image with a kernel. The result of the dilation operation is to enlarge elements of the preprocessed image. In one implementation the "cv.Dilate" function of OpenCV may be used.

At 304 a first contour of the dilated image is determined. A contour may be described as a curve that joins all continuous points along a boundary having a same color or intensity. In one implementation the "cv.drawContours" function of OpenCV may be used.

At 306 a first bounding box around the first contour is determined. The bounding box comprises a rectangle that compasses the entire contour. In one implementation the "cv.boundingRect" function of OpenCV may be used. In another implementation a rotated rectangle may be used. For example, the "cv.boxPoints" function of OpenCV may be used.

At 308, one or more of the width or the height of the first bounding box are compared to the dilated image or the preprocessed image to determine if the first bounding box spans an entire image. In one implementation, one or more of a first width of the first bounding box is determined to be within a first threshold value of a width of the dilated image, or a first height of the first bounding box is within a second threshold value of a height of the dilated image. In some implementations the threshold values may be determined based on the preprocessing of the input image data 108. For example, if a single pixel is added to a perimeter of the input image to determine the preprocessed image data 320, the first threshold value may be 2 pixels while the second threshold value is 2 pixels, to account for the added boundary. In other implementations other threshold values may be used.

At 310 a first image mask 322 is determined based on the first contour. The first image mask 322 may comprise an array of data, such as a bitmap, that is used to designate individual pixels that are to be set to a predetermined value upon application of the image mask 322. In this illustration, because the text "superwrench" spans the image, the image mask 322 comprises this contour. The other extraneous visible elements 140 that do not have contours spanning the image, are not included in the image mask 322 in this illustration.

At 312, the first image mask 322 is applied to the preprocessed image to determine a candidate image. For example, the first image mask 322 is applied to the preprocessed image data 320 to determine candidate image data 118. The application of the first image mask 322 may comprise setting pixels within the portion of the preprocessed image that are associated with the first contour as indicated by the image mask 322 to a predetermined value, such as "white" or "transparent". The resulting candidate image data 118 now omits the first contour that, in this example, was an extraneous visible element 140 that spanned the image.

The following code illustration may be used to implement the process, in some implementations.

```
def preProcessGraphics(target):
    inputImage=target.copy( )
    try:
        original=inputImage.copy( )
        # Flood Fill to cover any holes in the Contour images
        target=floodFillImage(original)
        contours=getAllContoursV2(target)
        _, la, _=getLargestArea(contours)
        next_largest=getArea(contours[1])
        shapeH=target.shape[0]
        shapeW=target.shape[1]
        mask=np.ones(target.shape[:2], dtype=np.uint8)*255
        for c in contours:
            x, y, w, h=cv2.boundingRect(c)
            area=getArea(c)
            # find if the contour spans full width or height
            if ((w==shapeW and h !=shapeH) or (w !=shapeW and h==shapeH)):
                # there is possibility that this is an actual image. So let check for that
                # find the 2nd largest contour and see if the size of that much smaller than this
                if (area==la):
                    if ((next_largest/la)>0.3):
                        # there is another contour much larger (30% or more) in size.
                        # So largest contour could be a graphics content. Mask it.
                        cv2.drawContours(mask, [c], -1, 0, -1)
                    else:
                        cv2.drawContours(mask, [c], -1, 0, -1)
        target=applyMask(original, mask)
        return target
    except:
        return inputImage
```
Code Illustration 6

FIG. 4 is a flow diagram 400 of a process for determining a candidate image by removing an element that is in a corner of an input image, according to one implementation. Extraneous visible elements 140 may appear more commonly in corners of an input image. For example, additional text, logos, and so forth, may be placed in the corners while the object 106 as depicted in the input image data 108 tends to be more centrally located within the image. In some implementations the process may be implemented at least in part by one or more image processing modules 116.

At 402 a preprocessed image is determined from an input image. For example, the image processing module 116 may determine the preprocessed image data 320 by one or more of adding a boundary to the input image data 108, setting background pixels to a predetermined value, and so forth.

At 404, a first contour of the preprocessed image is determined. For example, the "cv.drawContours" function of OpenCV may be used to process the preprocessed image data 320.

At 406 a first bounding box around the first contour is determined. The bounding box comprises a rectangle that compasses the entire contour. In one implementation the "cv.boundingRect" function of OpenCV may be used. In another implementation a rotated rectangle may be used. For example, the "cv.boxPoints" function of OpenCV may be used.

At 408 a first edge of the first bounding box is determined to be within a first threshold distance of a first edge of the preprocessed image.

At 410 a second edge of the first bounding box is determined to be within a second threshold distance of a second edge of the preprocessed image. The first edge of the preprocessed image and the second edge of the preprocessed image are adjacent to one another.

In some implementations the threshold values may be determined based on the preprocessing of the input image data 108. For example, if a single pixel is added to a perimeter of the input image to determine the preprocessed image data 320, the first threshold value may be 1 pixel while the second threshold value is 1 pixel, to account for the added boundary. In other implementations other threshold values may be used.

At 412 a first image mask 422 is determined based on the first contour. The first image mask 422 may comprise an array of data, such as a bitmap, that is used to designate individual pixels that are to be set to a predetermined value upon application of the image mask 422. In this illustration, because the text "superwrench" impinges upon the edges of the image, the image mask 422 comprises this contour. The other extraneous visible elements 140 do not have contours that are at the edge of image, and so are not included in the image mask 422 in this illustration.

At 414, the first image mask 422 is applied to the preprocessed image to determine a candidate image. For example, the first image mask 422 is applied to the preprocessed image data 320 to determine candidate image data 118. The application of the first image mask 422 may comprise setting pixels within the portion of the preprocessed image that are associated with the first contour as indicated by the image mask 422 to a predetermined value, such as "white" or "transparent". The resulting candidate image data 118 now omits the first contour that, in this example, was an extraneous visible element 140 in a corner of the preprocessed image data 320.

The following code illustration may be used to implement the process, in some implementations.

```
def removeCorners(target):
  inputImage=target.copy( )
  try:
    original=inputImage.copy( )
    target=floodFillImage(original)
    contours=getAllContoursV2(target)
    shapeH=original.shape[0]
    shapeW=original.shape[1]
    mask=np.ones(original.shape[:2],    dtype=np.uint8)
      *255
    corner=0
    cornerArea=shapeW*shapeH
    for c in contours:
      area=getArea(c)
      x, y, w, h=cv2.boundingRect(c)
      #2 is added as 1 pixel boundary is added to original
        image
      # for some contour it detect corners with these 2
        pixel but
      # for some images it detect corners without 2 pixel.
      # Hence both condition is added
      if ((x<=1 and y<=1)
        or (((x+w+2)==shapeW or (x+w)==shapeW) and
          y<=1)
        or (((y+h+2)==shapeH or (y+h)==shapeH) and
          x<=1)
        or (((x+w+2)==shapeW or (x+w)==shapeW) and
          ((y+h+2)==shapeH or ((y+h)==shapeH)))):
      # if there are more corners, select smallest one.
      # Actual image can be at the corner and should not
        be masked
        if (area<cornerArea):
          cornerArea=area
          corner=c
    _, la, _=getLargestArea(contours)
    # check if the selected Corner is indeed not the
      largest contour
    if (cornerArea<la):
      cv2.drawContours(mask, [corner], 0, (0, 255, 0),
        -1)
      target=applyMask(original, mask)
      return target
    else:
      return inputImage
  except:
    return inputImage
```
Code Illustration 7

Figure 5:
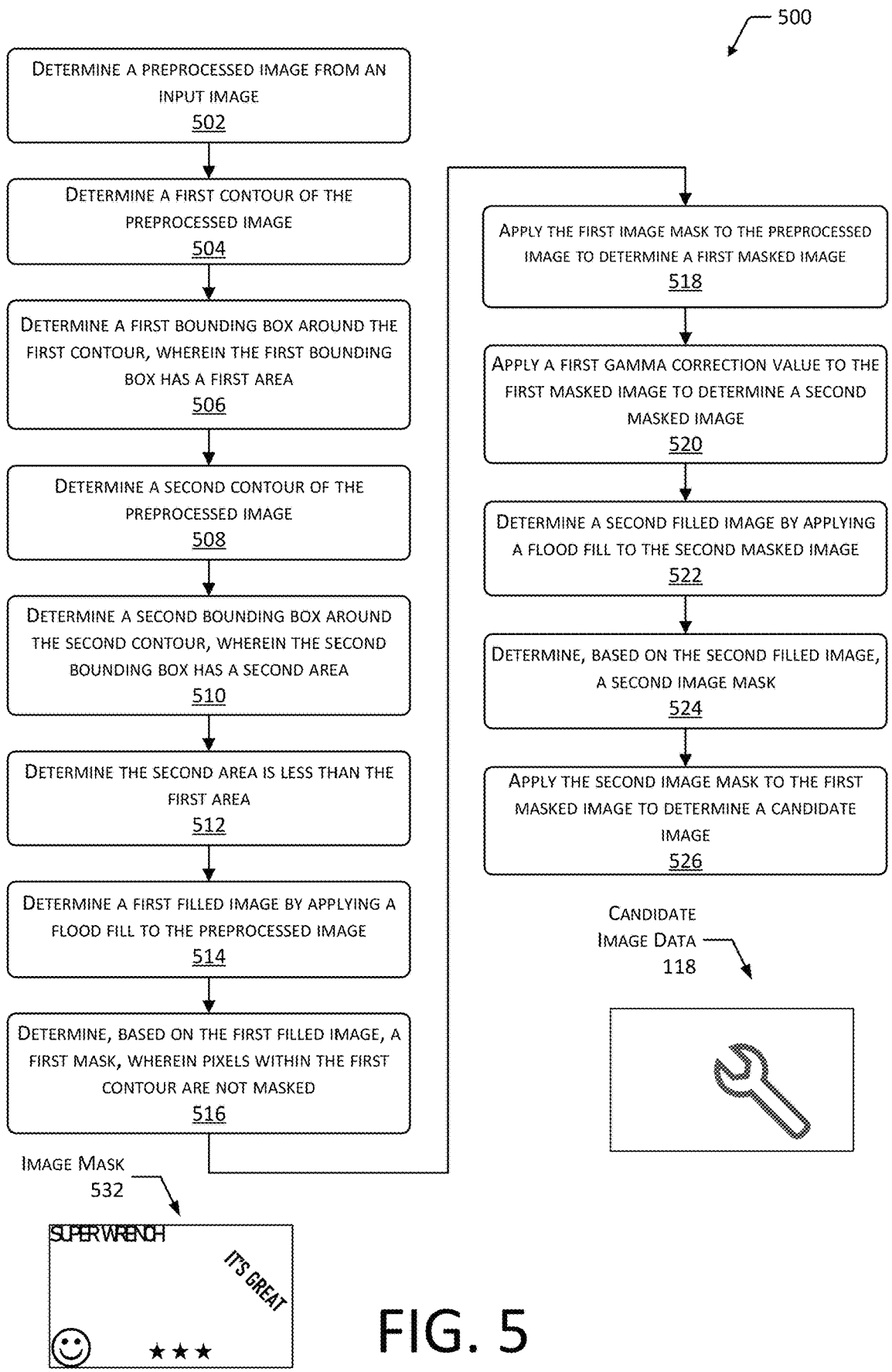
FIG. 5 is a flow diagram of a process for determining a candidate image by removing elements smaller than a threshold, according to one implementation.

FIG. 5 is a flow diagram 500 of a process for determining a candidate image by removing elements smaller than a threshold, according to one implementation. Some input images may contain an image of the object 106 and many smaller extraneous visible elements 140. For example, the input image data 108 may comprise a large depiction of the object 106 in one color and several smaller depictions of the object 106 in different colors. In some implementations the process may be implemented at least in part by one or more image processing modules 116.

At 502 a preprocessed image is determined from an input image. For example, the image processing module 116 may determine the preprocessed image data 320 by one or more of adding a boundary to the input image data 108, setting background pixels to a predetermined value, and so forth.

At 504, a first contour of the preprocessed image is determined. For example, the "cv.drawContours" function of OpenCV may be used to process the preprocessed image data 320.

At 506 a first bounding box around the first contour is determined. The first bounding box comprises a rectangle that compasses the entire first contour. In one implementation the "cv.boundingRect" function of OpenCV may be used. In another implementation a rotated rectangle may be used. For example, the "cv.boxPoints" function of OpenCV may be used. The first bounding box has a first area. For example, the first area may be calculated by multiplying the width and height of the first bounding box.

At 508, a second contour of the preprocessed image is determined. For example, the "cv.drawContours" function of OpenCV may be used to process the preprocessed image data 320.

At 510 a second bounding box around the second contour is determined. The second bounding box comprises a rectangle that compasses the entire second contour. The second bounding box has a second area. For example, the second area may be calculated by multiplying the width and height of the second bounding box.

At 512 the second area is determined to be less than the first area. For example, the second contour is smaller than the first contour.

At 514 a first filled image is determined by applying a flood fill to the preprocessed image. The flood fill is used to fill in relatively small holes or internal contours that may appear within a larger contour. In one implementation, the image processing module 116 may utilize the following instructions. These instructions fill holes in the image and set the pixels in those holes to a predetermined value, such as black. This set of operations prevents any internal contours like text of the image or smaller white sections from being detected. This improves the ability of the overall process 500 to detect the complete object 106 as a single contour.

```
def floodFillImage(target):
  im_in=cv2.cvtColor(target, cv2.COLOR_BGR2GRAY)
  # Threshold.
  # Set values equal to or above 220 to 0.
  # Set values below 220 to 255.
  th,   im_th=cv2.threshold(im_in,   220,   255,
    cv2.THRESH_BINARY_INV);
  # Copy the thresholded image.
  im_floodfill=im_th.copy( )
  # Mask used to flood filling.
  # Notice the size needs to be 2 pixels than the image.
  h, w=im_th.shape[:2]
  mask=np.zeros((h+2, w+2), np.uint8)
```

```
# Floodfill from point (0, 0)
cv2.floodFill(im_floodfill, mask, (0, 0), 255);
# Invert floodfilled image
im_floodfill_inv=cv2.bitwise_not(im_floodfill)
# Combine the two images to get the foreground.
im_out=im_th|im_floodfill_inv
return im_out
```
Code Illustration 8

At 516 a first image mask 532 is determined based on the first filled image, wherein the pixels within the first contour are not included in the image mask. In this illustration, because the first bounding box around the depiction of the wrench is the largest bounding box, the image mask 532 is representative of the other elements in the image.

At 518 the first image mask 532 is applied to the preprocessed image to determine a first masked image. For example, the first image mask 532 is applied to the preprocessed image data 320 to determine the first masked image. This first masked image may include some noise, such as extraneous pixels and so forth. To remove this noise the following operations may be performed.

At 520 a first gamma correction value is applied to the first masked image to determine a second masked image. Application of the first gamma correction value may operate to change the color values of any pixels to darker values. In effect, the first gamma correction value results in a second masked image that is substantially darker than the first masked image. This darkening increases the prominence of noise, such as the extraneous pixels, in the second masked image. For example, the "adjust_gamma" function of OpenCV may be used to process the first masked image to determine the second masked image.

A gamma correction value less than 1 will produce an output image that appears darker than the input image. A gamma value greater than 1 will produce an output image that appears lighter. In some implementations, changing the gamma value of an input image improves subsequent contour detection in the resulting output image. The following code illustration may be used to implement this, in some implementations.

```
def adjust_gamma(image, gamma=0.3):
    # build a lookup table mapping the pixel values [0, 255] to
    # their adjusted gamma values
    invGamma=1.0/gamma
    table=np.array([((i/255.0)**invGamma)*255
        for i in np.arange(0, 256)]).astype("uint8")
    # apply gamma correction using the lookup table
    return cv2.LUT(image, table)
```
Code Illustration 9

At 522, a second filled image is determined by applying a flood fill to the second masked image.

At 524, a second image mask is determined based on the second filled image.

At 526, a first candidate image is determined by applying the second image mask 532 to the first masked image. The application of the second image mask 532 to the first masked image removes the noise that remained in the second masked image.

In other implementations, instead of or in additional to the operations of 520 to 526, a despeckling operation may be performed.

Figure 6:
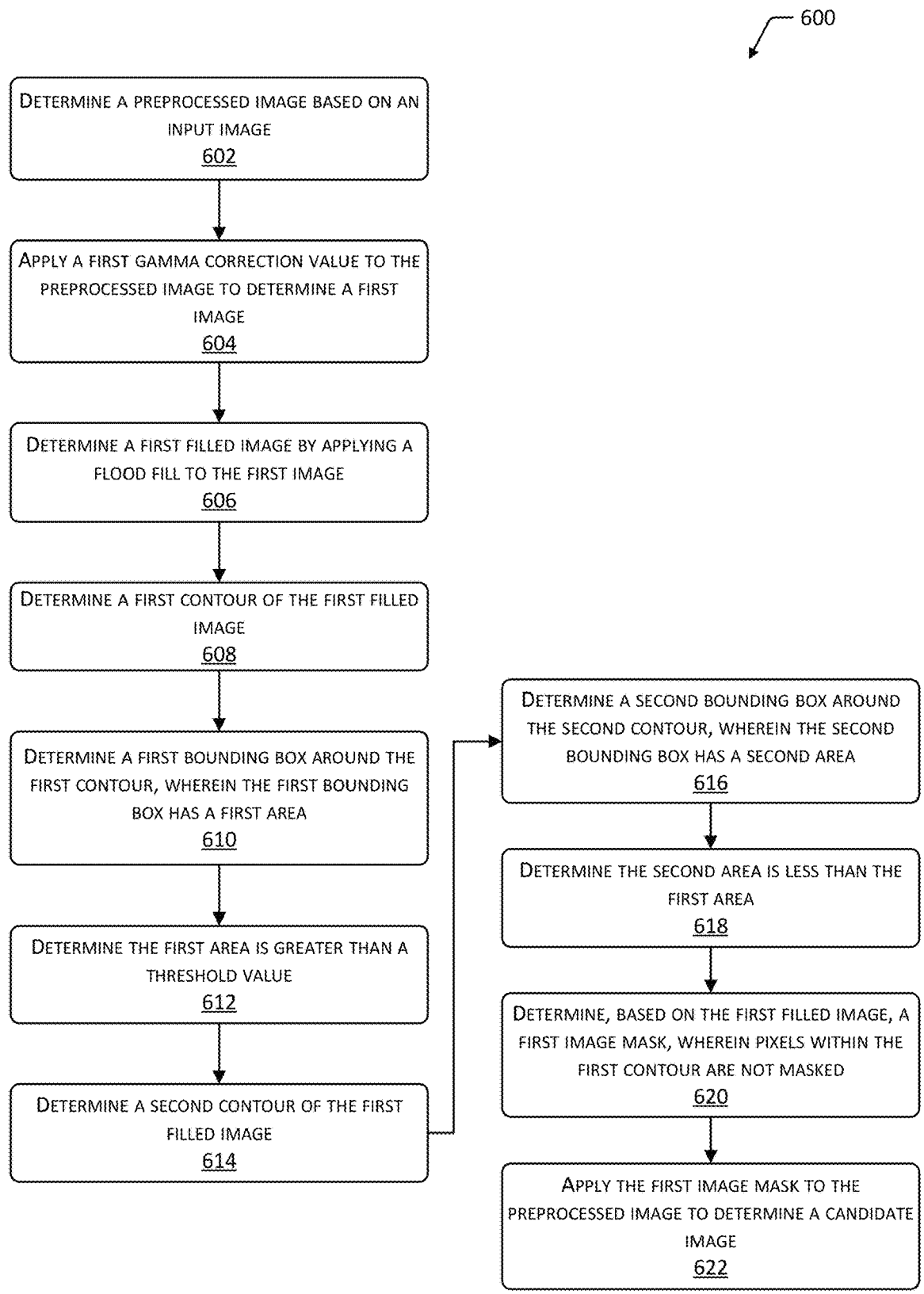
FIG. 6 is a flow diagram of a process for determining a candidate image by removing elements such as watermarks, according to one implementation.

FIG. 6 is a flow diagram 600 of a process for determining a candidate image by removing elements such as watermarks, according to one implementation. Watermarks may be characterized as elements that are typically lighter in color. In some implementations the process may be implemented at least in part by one or more image processing modules 116.

At 602 a preprocessed image is determined from an input image. For example, the image processing module 116 may determine the preprocessed image data 320 by one or more of adding a boundary to the input image data 108, setting background pixels to a predetermined value, and so forth.

At 604 a first gamma correction value is applied to the preprocessed image data 320 to determine a first image. Application of the first gamma correction value may operate to change the color values of any pixels to darker values. For example, the "adjust_gamma" function of OpenCV may be used to process the preprocessed image data 320 to determine the first image.

At 606 a first filled image is determined by applying a flood fill to the first image.

At 608, a first contour of the first filled image is determined. For example, the "cv.drawContours" function of OpenCV may be used to process the preprocessed image data 320.

At 610 a first bounding box around the first contour is determined. For example, the "cv.boundingRect" function of OpenCV may be used. The first bounding box has a first area. For example, the first area may be calculated by multiplying the width and height of the first bounding box.

At 612 the first area is determined to be greater than a threshold value. In some implementations, the threshold value comprises a "keep percentage factor". Contours associated with areas greater than the keep percentage factor may be retained for processing, while contours with areas less than the keep percentage factor may be discarded or removed by applying a mask.

At 614 a second contour of the first filled image is determined. For example, the "cv.drawContours" function of OpenCV may be used to process the first filled image.

At 616 a second bounding box around the second contour is determined. The second bounding box has a second area.

At 618 the second area is determined to be less than the first area.

At 620 a first image mask is determined based on the first filled image, wherein the pixels within the first contour are not included in the image mask.

At 622 a first candidate image is determined by applying the first image mask to the preprocessed image data 320. The application of the first image mask to the preprocessed image data 320 has the effect of removing the watermark from the preprocessed image.

The following code illustration may be used to implement the process, in some implementations.

```
def processWatermark(target, keepPercentage, w):
    inputImage=target.copy( )
    try:
        # alter brightness
        target=backgroundWhiten(target, w)
        original=target.copy( )
        target=adjust_gamma(target, 0.05)
        # Flood Fill to cover any holes in the Contour images
        target=flood FillImage(target)
        contours=getContours(target)
        ba, la, cnts, contourList=preProcess(contours, keepPercentage)
        mask=np.ones(target.shape[:2], dtype=np.uint8)*255
        # get all contours and mask others. This is one candidate sample
        for contour in contours:
            area=cv2.contourArea(contour)
```

```
    areaPercent=area/la
    # Check if area of the contour is smaller than largest
        contour by keepPercentage factor
    if (areaPercent<keepPercentage):
        # Found smaller candidate contour. Mask it
        cv2.drawContours(mask, [contour], -1, 0, -1)
    target=applyMask(original, mask)
    return target
except:
    return inputImage
```
Code Illustration 10

The following code illustration may be used to implement the process of setting a background to white, in some implementations.

```
def backgroundWhiten(image, lower=220):
    lower_white=np.array([lower, lower, lower],
        dtype=np.uint8)
    upper_white=np.array([255, 255, 255], dtype=np.uint8)
    mask=cv2.inRange(image, lower_white, upper_white) #
        could also use threshold
    # "erase" the small white points in the resulting mask
    mask=cv2.bitwise_not(mask) # invert mask
    # load background (could be an image too)
    bk=np.full(image.shape, 255, dtype=np.uint8) # white bk
    # get masked foreground
    fg_masked=cv2.bitwise_and(image, image, mask=mask)
    # get masked background, mask must be inverted
    mask=cv2.bitwise_not(mask)
    bk_masked=cv2.bitwise_and(bk, bk, mask=mask)
    # combine masked foreground and masked background
    final=cv2.bitwise_or(fg_masked, bk_masked)
    return final
```
Code Illustration 11

FIG. 7 is a flow diagram 700 of a process for determining a candidate image by removing circular elements, according to one implementation. In some situations, circular elements in the input image data 108 may be extraneous visible elements 140. This process may be used to determine and remove elements that are circular. In some implementations the process may be implemented at least in part by one or more image processing modules 116.

At 702 a preprocessed image is determined from an input image. For example, the image processing module 116 may determine the preprocessed image data 320 by one or more of adding a boundary to the input image data 108, setting background pixels to a predetermined value, and so forth.

At 704, a first filled image is determined by applying a flood fill to the preprocessed image.

At 706, a first filtered image is determined by applying a bilateral filter to the first filled image. The bilateral filter is a noise-reducing filter that uses a non-linear function and preserves edges. For example, the "bilateralFilter" function of OpenCV may be used to process the first filled image to determine the first filtered image.

At 708 a first edge image 740 is determined based on the first filtered image. The first edge image 740 may be determined using a Canny edge detector. For example, the "cv2.Canny" function of OpenCV may be used to process the first edge image 740 to determine the first filtered image.

At 710 a first contour of the first edge image 740 is determined.

At 712 the first contour is determined to be a circular polygon 742. For example, the first contour may be processed to determine if its circularity and convexity is within threshold values that are associated with a circular shape. For example, the "cv2.approxPolyDP" function of OpenCV may be used to process the first edge image 740 to determine the first contour is a circular polygon 742.

At 714 the first contour is determined to be within a threshold distance of a corner of the first edge image 740. This determination implements the observation that the object 106 of interest will tend to be more centrally located in the input image data 108. The farther away from the center of the first edge image 740 that the contour is located, the more likely it is that the contour is associated with an extraneous visible element 140.

At 716 a first image mask 744 is determined based on the first edge image 740. In particular, the portion of the first edge image 740 that is deemed to be associated with a circular polygon 742 may be used to determine the first image mask 744.

At 718 a candidate image is determined by applying the first image mask 744 to the preprocessed image. The resulting candidate image data 118 now omits the first contour that, in this example, was a circularly shaped extraneous visible element 140 that was not located centrally in the preprocessed image data 320.

In one implementation, a single contour that is determined to be circular may be removed to determine the candidate image. For example, if there are a plurality of circular contours, the contour that is removed using the first image mask 744 may be the contour that is determined to be closest to a corner, or farthest from a center of the first edge image 740. In another implementation, if there are a plurality of circular contours, two or more of the plurality of circular contours may be removed. For example, the top k contours as ranked by distance from a center of the first edge image 740 may be removed, where k is a nonzero positive integer. In some implementations the parameters 150 may specify one or more of k, threshold distance, and so forth.

The following code illustration may be used to implement the process, in some implementations.

```
def maskCircularContour(raw_image):
    original=raw_image.copy( )
    try:
        target=flood FillImage(raw_image)
        bilateral_filtered_image=cv2.bilateralFilter(target, 5, 175,
            175)
        # edge detection for finding circular shapes
        edge_detected_image=cv2.Canny(bilateral_filtered_image, 75, 200)
        contours=getAllContoursV2(edge_detected_image)
        _, la, _=getLargestArea(contours)
        contour_list=[ ]
        for contour in contours:
            area=getArea(contour)
            approx=cv2.approxPolyDP(contour,
                0.01*cv2.arcLength(contour, True), True)
            # number of polygon points for circular contours spans
                between 8 and 23
            if ((len(approx)>8) and (len(approx)<23) and
                area>1500):
                # check if shape is convex for circular shapes
                k=cv2.isContourConvex(approx)
                if k:
                    contour_list.append(contour)
        mask=np.ones(raw_image.shape[:2], dtype=np.uint8)
            *255
        shapeH=target.shape[0]
        shapeW=target.shape[1]
        shortestDist=shapeH*shapeW+1
        nearestContour=0
        # get all contours and mask others.
```

```
# Find if the contour is nearer to corner than center.
# also check if contour is not the largest contour.
# for all such cases, get the contour nearest to corner.
for contour in contour_list:
    dist=distanceFromCorner(contour, raw_image)
    c_dist=distanceFromCenter(contour, raw_image)
    area=getArea(contour)
    if (dist<shortestDist and dist<c_dist and area<la):
        shortestDist=dist
        nearestContour=contour
cv2.drawContours(mask, [nearestContour], -1, 0, -1)
final_image=applyMask(raw_image, mask)
return final_image
except:
    return original
```
Code Illustration 12

Figure 8:
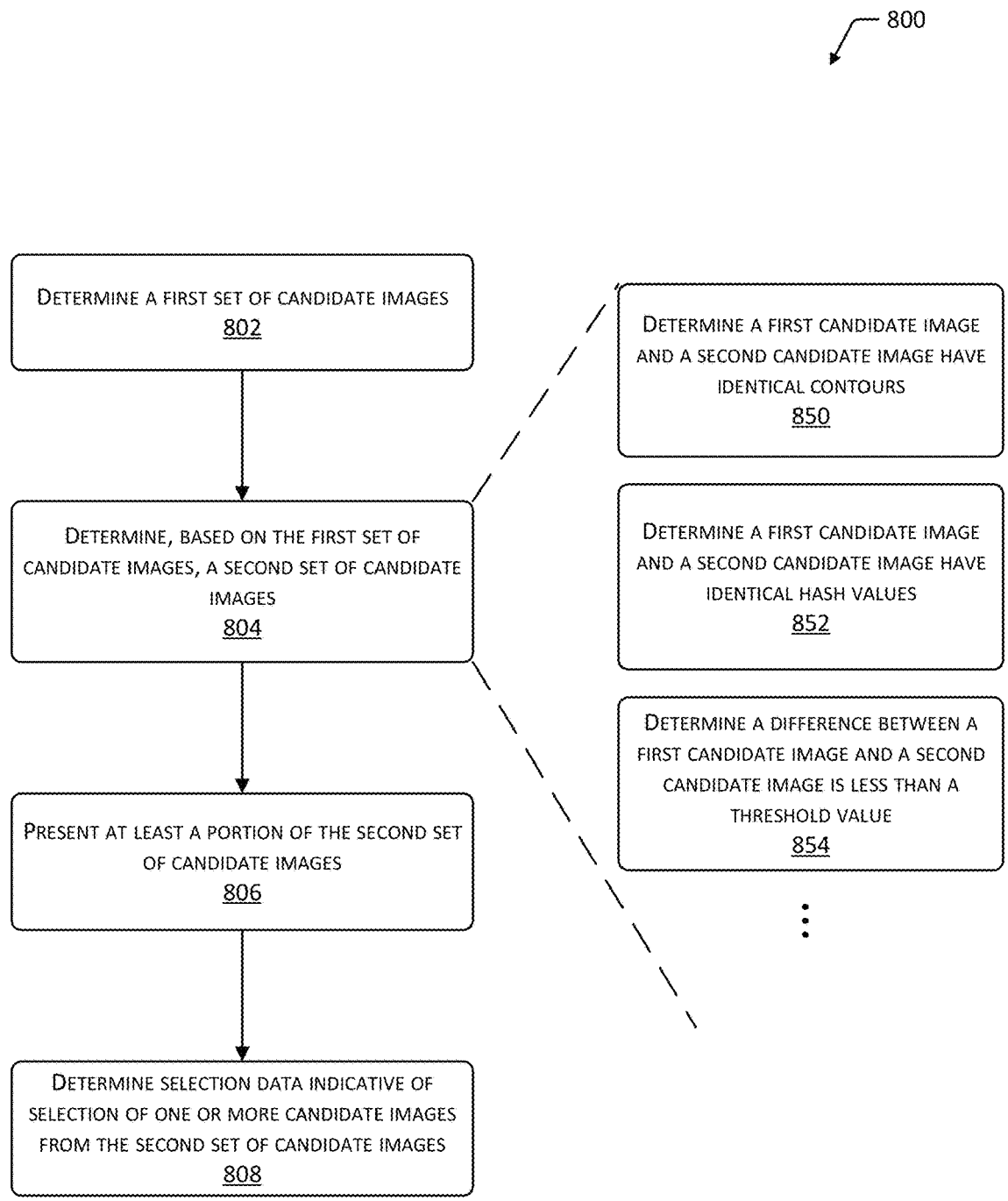
FIG. 8 is a flow diagram of a process for reducing duplicate candidate images in a set of candidate images, according to one implementation.

FIG. 8 is a flow diagram 800 of a process for reducing duplicate candidate images in a set of candidate images, according to one implementation. One or more of the various techniques described above, such as with regard to FIGS. 2-7, may be used in various combinations to produce the candidate image data 118 comprising a set of candidate images. In some situations, the different operations may result in otherwise identical candidate images. This process may be used to reduce duplicative or redundant images from the set of candidate images. By removing these redundant images, overall efficiency of the system is improved. For example, the operator assessing the candidate images may have fewer candidate images to consider. In another example, a machine learning system may avoid processing candidate images that are substantially the same. In some implementations the process may be implemented at least in part by one or more image processing modules 116.

At 802 a first set of candidate images are determined. For example, the image processing modules 116 may determine the candidate image data 118 using different combinations of the techniques described herein.

At 804, based on the first set of candidate images, a second set of candidate images is determined. A second count of the candidate images in the second set of candidate images is less than or equal to a first count of the candidate images in the first set of candidate images. For example, if no duplicates are present in the first set of candidate images, the second set of candidate images may be identical.

The process of determining duplicates may use one or more of the following techniques as described with regard to 850-854 to determine if a first candidate image and a second candidate image are similar.

At 850, the first candidate image and the second candidate image may be determined to have identical contours. For example, each may be processed to determine contours within the image. If the contours from each are coincident, the first candidate image and the second candidate image may be deemed identical.

At 852 the first candidate image and the second candidate image may be determined have identical hash values. For example, each may be processed with a hash function to determine a hash value. If those hash values are identical, the first candidate image and the second candidate image may be deemed identical.

At 854 a difference between the first candidate image and the second candidate image may be determined to be less than a threshold value. For example, the first candidate image may be subtracted from the second candidate image. The resulting differential image may be processed to determine a count of pixels have a value greater than a threshold value. If the count is less than the threshold value, the first candidate image and the second candidate image may be deemed to be the same.

In other implementations other techniques may be used to determine whether the first candidate image and the second candidate image are deemed substantially the same.

Returning to 804, the candidate images that are deemed to be identical may be disregarded from further operations, erased, and so forth.

At 806, the second set of candidate images comprising the non-duplicative candidate images is presented in the user interface 166. In another implementation, the second set of candidate images may be processed by a trained machine learning system. For example, first output data comprising instructions to present the first candidate image and not the second candidate image may be determined. The first output data may be sent to the computing device 160 that executes the instructions to present the first candidate image in the user interface 166.

At 808 selection data 170 indicative of the selection of one or more candidate images is determined. For example, the computing device 160 may use an input device to determine that the operator has selected a particular candidate image from the second set of candidate images. The selection data 170 may be provided to the image processing module 116. Responsive to the selection data 170, the selected candidate image may be designated as the selected image data 172 for later use.

The system 100 described in this disclosure may also be used in other situations as well. For example, the system 100 may be used to remove extraneous visible elements 140 from images for subsequent use in print advertising, signage with a store, printed catalogs, kiosks, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A system comprising:
   at least one memory storing computer-executable instructions; and
   at least one processor in communication with the at least one memory, the at least one processor executes the computer-executable instructions to:
   receive an input image depicting an object;
   determine a preprocessed image by adding a boundary to the input image;
   determine a first contour of the preprocessed image;
   determine a first area of the first contour;
   determine a second contour of the preprocessed image;
   determine a second area of the second contour;
   determine a third contour of the preprocessed image;
   determine a third area of the third contour;
   determine the second area is less than a first threshold percentage of the first area;
   determine the third area is less than the first threshold percentage of the first area;
   determine a first image mask based on the second contour and the third contour;
   determine a first candidate image by applying the first image mask to the preprocessed image;
   determine the second area is greater than a second threshold percentage of the first area;
   determine the third area is less than the second threshold percentage of the first area;
   determine a second image mask based on the third contour;
   determine a second candidate image by applying the second image mask to the preprocessed image;
   determine first output data comprising instructions to present the first candidate image and the second candidate image;
   determine selection data indicative the first candidate image;
   store the first candidate image, wherein the first candidate image is associated with the object; and
   determine second output data comprising instructions to present the first candidate image.

2. A method comprising:
   determining an input image depicting an object;
   determining a preprocessed image by adding a boundary to the input image;
   determining a first contour of the preprocessed image;
   determining a first area of the first contour;
   determining a second contour of the preprocessed image;
   determining a second area of the second contour;
   determining the second area is less than a first threshold percentage of the first area;
   determining a first image mask based on the second contour;
   determining a first candidate image by applying the first image mask to the preprocessed image;
   determining the second area is greater than a second threshold percentage of the first area;
   determining a second candidate image by applying a second image mask to the preprocessed image;
   determining first output data comprising instructions to present the first candidate image and the second candidate image;
   determining selection data indicative of the first candidate image; and
   storing the first candidate image.

3. The system of claim 1, wherein the at least one processor further executes the computer-executable instructions to:
   set a background color of the input image to a predetermined value.

4. The system of claim 1, wherein the at least one processor further executes the computer-executable instructions to:
   determine a dilated image by applying a dilation function to the preprocessed image;
   determine a first bounding box around the first contour;
   determine one or more of:
      a first width of the first bounding box is within a first threshold value of a width of the dilated image; or
      a first height of the first bounding box is within a second threshold value of a height of the dilated image; and
   wherein the determination of the first candidate image further comprises setting pixels within a portion of the preprocessed image that is associated with the first contour to a predetermined value.

5. The system of claim 1, wherein the at least one processor further executes the computer-executable instructions to:
   determine a first bounding box around the first contour;
   determine a first edge of the first bounding box is within a first threshold distance of a first edge of the preprocessed image;
   determine a second edge of the first bounding box is within a second threshold distance of a second edge of the preprocessed image, wherein the first edge of the preprocessed image and the second edge of the preprocessed image are adjacent; and
   wherein the determination of the first candidate image further comprises setting pixels within a portion of the preprocessed image that is associated with the first contour to a predetermined value.

6. The system of claim 1, wherein the at least one processor further executes the computer-executable instructions to:
   determine a first bounding box around the first contour;
   determine a fourth area of the first bounding box;
   determine a second bounding box around the second contour;
   determine a fifth area of the second bounding box;
   determine the fifth area is less than the fourth area;
   determine a first filled image by applying a flood fill to the preprocessed image;
   determine a first masked image by applying the first image mask to the preprocessed image;
   determine a second masked image by applying a first gamma correction value to the first masked image;

determine a second filled image by applying a flood fill to the second masked image; and determine a third image mask based on the second filled image; and wherein the determination of the first candidate image is further based on applying the third image mask to the first masked image.

7. The system of claim 1, wherein the at least one processor further executes the computer-executable instructions to:

determine that the first candidate image and the second candidate image are similar, wherein the determination comprises one or more of:

determine the first candidate image and the second candidate image have identical contours;

determine the first candidate image and the second candidate image have identical hash values; or determine a difference between the first candidate image and the second candidate image is less than a threshold value; and determine third output data comprising instructions to present the first candidate image and not the second candidate image.

8. The system of claim 1, wherein the at least one processor further executes the computer-executable instructions to:

determine a first set of training data, wherein the first set of training data comprises:

a first set of one or more candidate images; and a first set of selection data that is indicative of selection of individual ones of the first set of one or more candidate images;

train a machine learning system that uses the first set of training data; and wherein the determination of the selection data comprises: process the first set of one or more candidate images using the machine learning system.

9. The method of claim 2, further comprising:
determining second output data comprising instructions to present the first candidate image.

10. The method of claim 2, further comprising:
determining a third contour of the preprocessed image;
determining a third area of the third contour;
determining the third area is less than the first threshold percentage of the first area; and
determining the third area is less than the second threshold percentage of the first area; and
wherein applying the second image mask is based on the third contour.

11. The method of claim 2, wherein the determining of the preprocessed image further comprises setting a background color of the input image to a predetermined value.

12. The method of claim 2, further comprising:
determining a dilated image by applying a dilation function to the preprocessed image;
determining a first bounding box around the first contour;
determining one or more of:
a first width of the first bounding box is within a first threshold value of a width of the dilated image; or
a first height of the first bounding box is within a second threshold value of a height of the dilated image; and wherein determining the first candidate image further comprises setting pixels within a portion of the preprocessed image that is associated with the first contour to a predetermined value.

13. The method of claim 2, further comprising:
determining a first bounding box around the first contour;
determining a first edge of the first bounding box is within a first threshold distance of a first edge of the preprocessed image;
determining a second edge of the first bounding box is within a second threshold distance of a second edge of the preprocessed image, wherein the first edge of the preprocessed image and the second edge of the preprocessed image are adjacent; and
wherein determining the first candidate image further comprises setting pixels within a portion of the preprocessed image that is associated with the first contour to a predetermined value.

14. The method of claim 2, further comprising:
determining a first bounding box around the first contour;
determining a third area of the first bounding box;
determining a second bounding box around the second contour;
determining a fourth area of the second bounding box;
determining the fourth area is less than the third area;
determining a first filled image by applying a flood fill to the preprocessed image;
determining a first masked image by applying the first image mask to the preprocessed image;
determining a second masked image by applying a first gamma correction value to the first masked image;
determining a second filled image by applying a flood fill to the second masked image; and
determining a second image mask based on the second filled image; and
wherein determining the first candidate image is further based on applying the second image mask to the first masked image.

15. The method of claim 2, further comprising:
determining that the first candidate image and the second candidate image are similar, the determining comprising one or more of:
determining the first candidate image and the second candidate image have identical contours;
determining the first candidate image and the second candidate image have identical hash values; or
determining a difference between the first candidate image and the second candidate image is less than a threshold value; and
determining second output data comprising instructions to present the first candidate image and not the second candidate image.

16. The method of claim 2, further comprising:
determining a first set of training data, wherein the first set of training data comprises:
a first set of one or more candidate images; and
a first set of selection data that is indicative of selection of individual ones of the first set of one or more candidate images;
training a machine learning system using the first set of training data; and
wherein the determining the selection data comprises:
processing the first set of one or more candidate images using the machine learning system.

* * * * *

UNITED STATES PATENT AND TRADEMARK OFFICE
CERTIFICATE OF CORRECTION

PATENT NO. : 11,238,595 B2
APPLICATION NO. : 16/988388
DATED : February 1, 2022
INVENTOR(S) : Bhattacharya et al.

It is certified that error appears in the above-identified patent and that said Letters Patent is hereby corrected as shown below:

On the Title Page

Under item (56), References Cited add the following:
--9,489,401 Garcia et al.
10,042,541 Sutou et al.
10,909,166 Bogazzi
2011/0314031 Chittar et al.
2012/0128239 Goswami et al.
2021/0149946 VanBlon et al.--

In the Claims

Column 21, Claim 1, Line 52:
Currently reads "determine selection data indicative the first candidate"
Where it should read: --determine selection data indicative of the first candidate--

Signed and Sealed this
Twenty-fourth Day of May, 2022

Katherine Kelly Vidal
*Director of the United States Patent and Trademark Office*